United States Patent
Wang et al.

(10) Patent No.: US 9,777,657 B2
(45) Date of Patent: Oct. 3, 2017

(54) ON-LINE ADAPTIVE PID CONTROL OF AIR CHARGING SYSTEM

(71) Applicant: GM GLOBAL TECHNOLOGY OPERATIONS LLC, Detroit, MI (US)

(72) Inventors: Yue-Yun Wang, Troy, MI (US); Ibrahim Haskara, Macomb, MI (US); Chen-Fang Chang, Troy, MI (US); Steven E. Muldoon, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 139 days.

(21) Appl. No.: 14/573,554

(22) Filed: Dec. 17, 2014

(65) Prior Publication Data

US 2016/0177852 A1   Jun. 23, 2016

(51) Int. Cl.
  *F02D 41/14*   (2006.01)
  *F02D 41/00*   (2006.01)

(52) U.S. Cl.
  CPC ....... *F02D 41/1401* (2013.01); *F02D 41/005* (2013.01); *F02D 41/0007* (2013.01); *F02D 41/1402* (2013.01); *F02D 41/1406* (2013.01); *F02D 2041/141* (2013.01); *F02D 2041/1409* (2013.01); *F02D 2041/1422* (2013.01); *F02D 2041/1427* (2013.01); *F02D 2041/1434* (2013.01); *Y02T 10/144* (2013.01); *Y02T 10/47* (2013.01)

(58) Field of Classification Search
  CPC ............. F02D 41/0007; F02D 41/1401; F02D 2041/1409; F02D 2041/1433; F02D 2200/0406; F02D 23/00; F02D 41/18; F02D 41/0052; F02D 2041/141; F02D 2200/0402; Y02T 10/144; Y02T 10/47; Y02T 10/42; F02M 26/05; F02M 26/06; F02M 26/03
  USPC ................................. 701/102, 103, 108, 109
  See application file for complete search history.

(56) References Cited

U.S. PATENT DOCUMENTS

| | | | | |
|---|---|---|---|---|
| 6,216,083 B1 * | 4/2001 | Ulyanov | ............ | G05B 13/0285 701/106 |
| 6,272,859 B1 * | 8/2001 | Barnes | ..................... | F02B 37/24 60/602 |
| 2009/0281713 A1 * | 11/2009 | Jankovic | ................... | F01N 5/02 701/111 |
| 2012/0173118 A1 * | 7/2012 | Wang | .................. | F02D 41/0002 701/102 |
| 2014/0074382 A1 * | 3/2014 | Methil-Sudhakaran | ........................... | F02D 41/1401 701/107 |

(Continued)

*Primary Examiner* — Sizo Vilakazi (57) ABSTRACT

An internal combustion engine includes an air charging system. A method to control the air charging system includes providing a desired operating target command for the air charging system, and monitoring operating parameters of the air charging system. An error between the desired operating target command for the air charging system and the corresponding one of said operating parameters of the air charging system is determined, and scheduled PID gains are determined based on the error utilizing a PID controller. An adaptive algorithm is applied to modify the scheduled PID gains, and a system control command for the air charging system is determined based upon the modified scheduled PID gains. The air charging system is controlled based upon the system control command for the air charging system.

16 Claims, 6 Drawing Sheets

(56) References Cited

U.S. PATENT DOCUMENTS

2014/0373814 A1* 12/2014 Herold ............... F02D 41/0007
123/51 B

* cited by examiner

ON-LINE ADAPTIVE PID CONTROL OF AIR CHARGING SYSTEM

TECHNICAL FIELD

This disclosure is related to control of internal combustion engines.

BACKGROUND

The statements in this section merely provide background information related to the present disclosure. Accordingly, such statements are not intended to constitute an admission of prior art.

Engine control includes control of parameters in the operation of an engine based upon a desired engine output, including an engine speed and an engine load, and resulting operation, for example, including engine emissions. Parameters controlled by engine control methods include air flow, fuel flow, and intake and exhaust valve settings.

Boost air can be provided to an engine to provide an increased flow of air to the engine relative to a naturally aspirated intake system to increase the output of the engine. A turbocharger utilizes pressure in an exhaust system of the engine to drive a compressor providing boost air to the engine. Exemplary turbochargers can include variable geometry turbochargers (VGT), enabling modulation of boost air provided for given conditions in the exhaust system. A supercharger utilizes mechanical power from the engine, for example as provided by an accessory belt, to drive a compressor providing boost air to the engine. Engine control methods control boost air in order to control the resulting combustion within the engine and the resulting output of the engine.

Exhaust gas recirculation (EGR) is another engine control parameter. An exhaust gas flow within the exhaust system of an engine is depleted of oxygen and is essentially an inert gas. When introduced to or retained within a combustion chamber in combination with a combustion charge of fuel and air, the exhaust gas moderates the combustion, reducing an output and an adiabatic flame temperature. EGR can also be controlled in combination with other parameters in advanced combustion strategies, for example, including homogeneous charge compression ignition (HCCI) combustion. EGR can also be controlled to change properties of the resulting exhaust gas flow. Engine control methods control EGR in order to control the resulting combustion within the engine and the resulting output of the engine.

Air handling systems for an engine manage the flow of intake air and EGR into the engine. Air handling systems must be equipped to meet charge air composition targets (e.g. an EGR fraction target) to achieve emissions targets, and meet total air available targets (e.g. the charge flow mass flow) to achieve desired power and torque targets. The actuators that most strongly affect EGR flow generally affect charge flow, and the actuators that most strongly affect charge flow generally affect EGR flow. Therefore, an engine with a modern air handling system presents a multiple input multiple output (MIMO) system with coupled input-output response loops.

MIMO systems, where the inputs are coupled, i.e. the input-output response loops affect each other, present well known challenges in the art. An engine air handling system presents further challenges. The engine operates over a wide range of parameters including variable engine speeds, variable torque outputs, and variable fueling and timing schedules. In many cases, exact transfer functions for the system are unavailable and/or the computing power needed for a standard decoupling calculation is not available.

Control loops may be used in determining boost air and EGR control commands. Feedback control methods may be utilized in the control loops to minimize error between a measured process variable and a desired setpoint. This minimized error is utilized in feedback control calibration of a system control command, such as a boost air control command and an EGR control command.

SUMMARY

An internal combustion engine includes an air charging system. A method to control the air charging system includes providing a desired operating target command for the air charging system, and monitoring operating parameters of the air charging system. An error between the desired operating target command for the air charging system and the corresponding one of said operating parameters of the air charging system is determined, and scheduled PID gains are determined based on the error utilizing a PID controller. An adaptive algorithm is applied to modify the scheduled PID gains, and a system control command for the air charging system is determined based upon the modified scheduled PID gains. The air charging system is controlled based upon the system control command for the air charging system.

BRIEF DESCRIPTION OF THE DRAWINGS

One or more embodiments will now be described, by way of example, with reference to the accompanying drawings, in which:

FIG. 6-1 graphically depicts a comparison of adaptive PID control and default PID control with a damping decrease of 50%, in accordance with the present disclosure;

FIG. 6-2 graphically depicts a comparison of adaptive PID control and default PID control with a damping increase of 100%, in accordance with the present disclosure;

DETAILED DESCRIPTION

Figure 1:
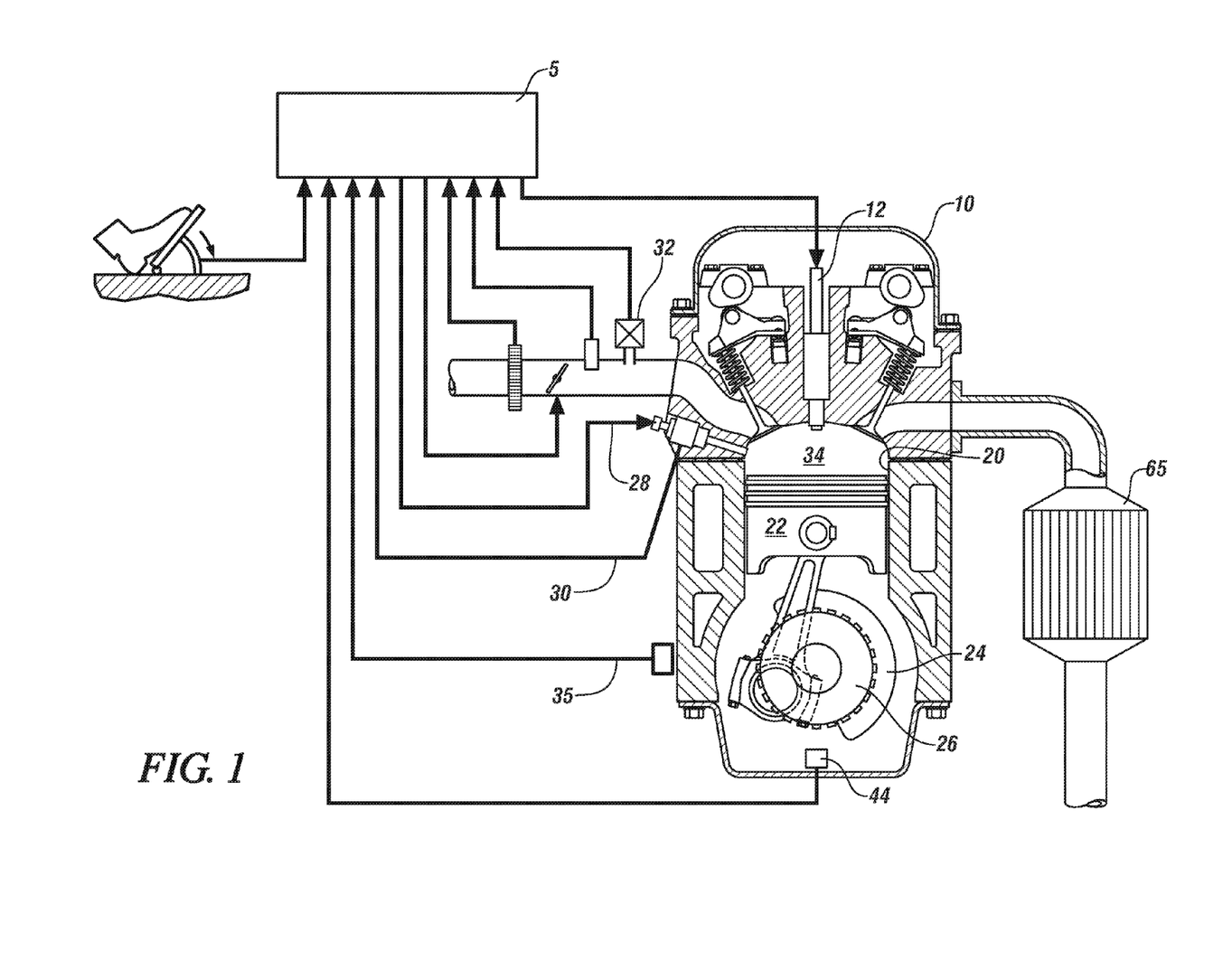
FIG. 1 schematically depicts an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 schematically depicts an exemplary internal combustion engine 10, control module 5, and exhaust aftertreatment system 65, in accordance with the present disclosure. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request, $T_{O\_REQ}$. The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensors to monitor engine operation, and actuators which control engine operation. The sensors and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate either at stoichiometry or primarily lean of stoichiometry, e.g., lean-burn spark-ignition engines or the conventional gasoline engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods disclosed herein are particularly suited to operation with direct-injection compression-ignition engines operating lean of stoichiometry to determine parameters which correlate to heat release in each of the combustion chambers during ongoing operation. The methods are further applicable to other engine configurations and their subsystems, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and where applicable, a post-combustion fuel injection event for aftertreatment management, each which affects cylinder pressure.

Sensors are installed on or near the engine to monitor physical characteristics and generate signals which are correlatable to engine and ambient parameters. The sensors include a crankshaft rotation sensor, including a crank sensor 44 for monitoring crankshaft (i.e. engine) speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 is input to the control module 5. A combustion pressure sensor 30 is adapted to monitor in-cylinder pressure (COMB_PR). The combustion pressure sensor 30 is preferably non-intrusive and includes a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the pressure sensor 30. The output signal, COMB_PR, of the pressure sensor 30 is proportional to cylinder pressure. The pressure sensor 30 includes a piezoceramic or other device adaptable as such. Other sensors preferably include a manifold pressure sensor for monitoring manifold pressure (MAP) and ambient barometric pressure (BARO), a mass air flow sensor for monitoring intake mass air flow (MAF) and intake air temperature ($T_{IN}$), and a coolant sensor 35 monitoring engine coolant temperature (COOLANT). The system may include an exhaust gas sensor for monitoring states of one or more exhaust gas parameters, e.g., temperature, air/fuel ratio, and constituents. One skilled in the art understands that there may be other sensors and methods for purposes of control and diagnostics. The operator input, in the form of the operator torque request, $T_{O\_REQ}$, is typically obtained through a throttle pedal and a brake pedal, among other devices. The engine is preferably equipped with other sensors for monitoring operation and for purposes of system control. Each of the sensors is signally connected to the control module 5 to provide signal information which is transformed by the control module to information representative of the respective monitored parameter. It is understood that this configuration is illustrative, not restrictive, including the various sensors being replaceable with functionally equivalent devices and routines.

The actuators are installed on the engine and controlled by the control module 5 in response to operator inputs to achieve various performance goals. Actuators include an electronically-controlled throttle valve which controls throttle opening in response to a control signal (ETC), and a plurality of fuel injectors 12 for directly injecting fuel into each of the combustion chambers in response to a control signal (INJ_PW), all of which are controlled in response to the operator torque request, $T_{O\_REQ}$. An exhaust gas recirculation valve 32 and cooler control flow of externally recirculated exhaust gas to the engine intake, in response to a control signal (EGR) from the control module. A glow-plug 28 is installed in each of the combustion chambers and adapted for use with the combustion pressure sensor 30. Additionally, a charging system can be employed in some embodiments supplying boost air according to a desired manifold air pressure.

Fuel injector 12 is a high-pressure fuel injector adapted to directly inject a fuel charge into one of the combustion chambers in response to the command signal, INJ_PW, from the control module. Each of the fuel injectors 12 is supplied pressurized fuel from a fuel distribution system, and has operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 executes routines stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the desired functionality. The control module has a set of control routines, including resident software program instructions and calibrations stored in memory and executed to provide the desired functions. The routines are preferably executed during preset loop cycles. Routines are executed, such as by a central processing unit, and are operable to monitor inputs from sensors and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

FIG. 1 depicts an exemplary diesel engine, however, the present disclosure can be utilized on other engine configurations, for example, including gasoline-fueled engines, ethanol or E85 fueled engines, or other similar known designs. The disclosure is not intended to be limited to the particular exemplary embodiments disclosed herein.

Figure 2:
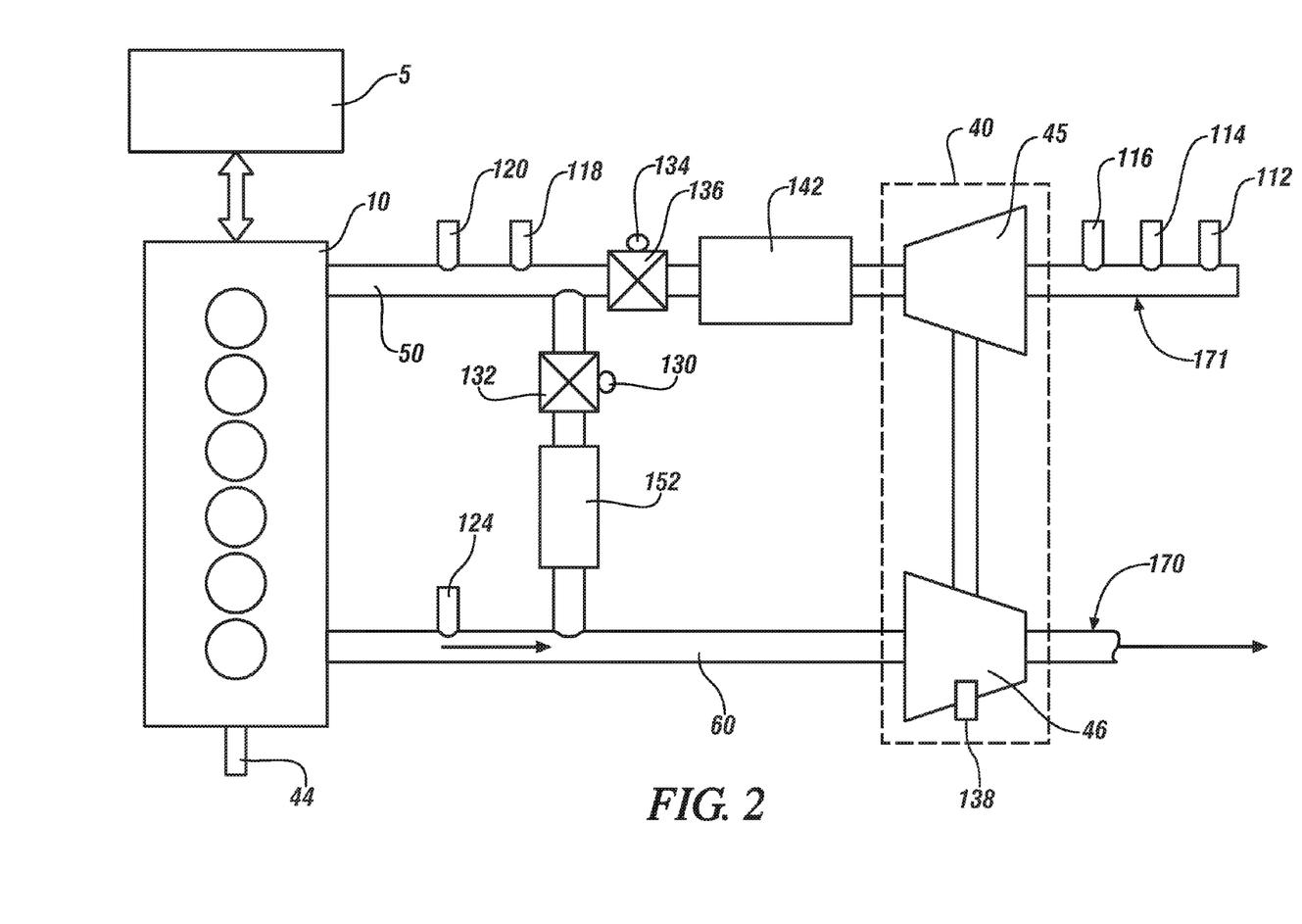
FIG. 2 schematically depicts an exemplary engine configuration including a turbocharger, an accordance with the present disclosure.

FIG. 2 schematically depicts an exemplary engine configuration including a turbocharger, in accordance with the present disclosure. The exemplary engine is multi-cylinder and includes a variety of fueling types and combustion strategies known in the art. Engine system components include an intake air compressor 40 including a turbine 46 and an air compressor 45, an air throttle valve 136, a charge air cooler 142, an EGR valve 132 and cooler 152, an intake manifold 50, and exhaust manifold 60. Ambient intake air is drawn into compressor 45 through intake 171. Pressurized intake air and EGR flow are delivered to intake manifold 50 for use in engine 10. Exhaust gas flow exits engine 10 through exhaust manifold 60, drives turbine 46, and exits through exhaust tube 170. The depicted EGR system is a high pressure EGR system, delivering pressurized exhaust gas from exhaust manifold 60 to intake manifold 50. An alternative configuration, a low pressure EGR system, can deliver low pressure exhaust gas from exhaust tube 170 to intake 171. Sensors are installed on the engine to monitor physical characteristics and generate signals which are correlatable to engine and ambient parameters. The sensors preferably include an ambient air pressure sensor 112, an ambient or intake air temperature sensor 114, and a mass air flow sensor 116 (all which can be configured individually or as a single integrated device), an intake manifold air temperature sensor 118, an MAP sensor 120, an exhaust gas temperature sensor 124, an air throttle valve position sensor 134 and an EGR valve position sensor 130, and a turbine vane position sensor 138. Engine speed sensor 44 monitors rotational speed of the engine. Each of the sensors is signally connected to the control module 5 to provide signal information which is transformed by the control module 5 to information representative of the respective monitored parameter. It is understood that this configuration is illustrative, not restrictive, including the various sensors being replaceable within functionally equivalent devices and routines and still fall within the scope of the disclosure. Furthermore, the intake air compressor 40 may include alternative turbocharger configurations within the scope of this disclosure.

The intake air compressor 40 includes a turbocharger including an air compressor 45 positioned in the air intake of the engine which is driven by turbine 46 that is positioned in the exhaust gas flowstream. Turbine 46 can include a number of embodiments, including a device with fixed vane orientations or variable vane orientations. Further, a turbocharger can be used as a single device, or multiple turbochargers can be used to supply boost air to the same engine.

The engine configuration, such as the exemplary engine configuration, including a turbocharger, as is schematically depicted in FIG. 2 may be represented by a mathematical model. Model-based boost control algorithms using physics-based energy balance relation of a turbocharger may be used to decouple the design of boost or turbocharger control from air and EGR system controls. By using the physics-based turbocharger energy balance model with feedback linearization or feedforward control architectures a nonlinear control problem may be transformed into an approximately linearized feedback system. This decoupled boost control may reduce vehicle calibration work for altitude and extreme ambient operating conditions. The decoupled control simplifies design work, and model based control design can be calibrated at dyno test cell, which works for varying operating conditions with reduced vehicle calibrations.

An inverse flow model or an inverse of a physical model of a system can be useful in determining settings required to achieve a desired flow through an orifice in the system. Flow through a system can be modeled as a function of a pressure difference across the system and a flow restriction in the system. Known or determinable terms can be substituted and the functional relationship manipulated to make an inverse flow model of the system useful to determine a desired system setting to achieve a desired flow. Exemplary methods disclosed herein utilize a first input of an effective flow area or of a flow restriction for the system being modeled, and a second input including a pressure value for the system of pressure moving the flow through the system. One exemplary method of decoupled feed forward control of an EGR valve can include utilizing an inverse flow model of the system embodied in a mixed polynomial based upon the inverse model and calibrated terms. Another exemplary method of decoupled feed forward control of an EGR valve can include utilizing a dimensional table-based approach. Another exemplary method of decoupled feed forward control of an EGR valve can include utilizing an exponential polyfit model. An exemplary method of decoupled feed forward control of air throttle can utilize an inverse of the physical model of the system, a dimensional table approach, or an exponential polyfit model. An exemplary method of decoupled feed forward control of a charging system, such as a turbocharger equipped with a VGT, can utilize an inverse of the physical model of the system, a dimensional table approach, or an exponential polyfit model.

These methods can be utilized individually or in combination, and different methods can be utilized for the same system for different conditions and operating ranges. A control method can utilize an inverse flow model to determine a feed forward control command for a first selection including one of the EGR circuit, the air throttle system, and the charging system. The control method can additionally utilize a second inverse flow model to determine a second feed forward control command for a second selection including another of the EGR circuit, the air throttle system, and the charging system. The control method can additionally utilize a third inverse flow model to determine a third feed forward control command for a third selection including another of the EGR circuit, the air throttle system, and the charging system. In this way, a control method can control any or all of the EGR circuit, the air throttle system, and the charging system.

A method to control EGR flow by an inverse control method according to an inverse model of EGR flow is disclosed in co-pending and commonly assigned application Ser. No. 12/982,994, corresponding to publication US 2012-0173118 A1, which is incorporated herein by reference.

Feedback control modules are implemented in linear control strategies to determine feedback control commands using feedback control methods. Exemplary feedback control methods used by feedback control modules can include proportional-integral-derivative (PID) feedback control methods. In an exemplary embodiment PID control modules can be designed individually to output decoupled feedback control signals for each system to be controlled in a MIMO system.

A method of applying automated algorithms for on-line fine tuning of PID gains may be applied to feedback control systems using PID feedback control methods to reduce feedback control calibration and optimize the feedback control system. In addition to reducing feedback control calibration and improving transient responses, this method may compensate system performances due to aging, such as EGR cooler fouling. This method may further enhance robustness against plant uncertainties, such as operating temperature and pressure changes, and may also reduce the number of PID calibrations required in gain scheduling.

Figure 3:
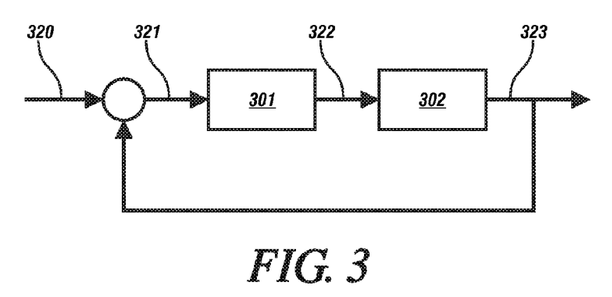
FIG. 3 schematically depicts an exemplary closed-loop feedback control system, in accordance with the present disclosure.

FIG. 3 schematically depicts an exemplary closed-loop feedback control system, in accordance with the present disclosure. A system to be controlled 302 is represented by a mathematical model, time-varying plant function F(u(t)). A reference setpoint r(t) 320 is input into the closed-loop feedback system. The reference setpoint 320 is then compared with a measured output of the system to be controlled y(t) 323 and the difference is the error value e(t) 321. Error value e(t) is input into a PID controller 301. The PID controller attempts to minimize the error value e(t) by manipulating the value. This includes the use of three correcting terms, the proportional, integral and derivative terms. These terms are summed up to calculate the output of the PID controller, feedback control command u(t) 322. Feedback control command 322 is then input into the time-varying plant F(u(t)) of the system to be controlled 302, thus controlling the system 302. As the time-varying plant F(u(t)) inputs feedback control command u(t) 322 and outputs y(t) 323, the plant may be represented by the following relationship:

$$y(t)=F(u(t)) \quad [1]$$

PID controller output u(t) 322 is equivalent to the algorithm implemented by the PID controller 301 and may be represented by the following relationship:

$$u(t)=K_p e(t)+K_I \int e(t)dt+K_D \dot{e}(t) \quad [2]$$

wherein $K_p$ is a proportional gain,
$K_I$ is an integral gain,
$K_D$ is a derivative gain,
t is time, and
e(t) is an error function determining an error value between a setpoint and a monitored system parameter.

A time-varying plant of system to be controlled 302 may alternatively include a disturbance, which would impact the measured output of the system to be controlled y(t) 323. In this case, the time-varying plant with disturbance may be represented by the following relationship:

$$y(t)=f(t)+g(t)*u(t)=f(t)+\theta^T \varnothing \quad [3]$$

wherein f(t) is a disturbance function,
g(t) is a system gain function,
u(t) is a PID controller algorithm,
$\theta^T$ is a vector of PID gains, and
$\varnothing$ is the product of the system gain function and the error vector.

$\theta^T$ can be expressed by the following relationship:

$$\theta^T = \begin{bmatrix} K_P \\ K_I \\ K_D \end{bmatrix} \quad [4]$$

$\varnothing$ can be expressed by the following relationship:

$$\phi = g(t) \begin{bmatrix} e(t) \\ \int e(t)dt \\ \dot{e}(t) \end{bmatrix} \quad [5]$$

A closed-loop feedback system, such as the one schematically depicted in FIG. 3 may be represented as a cost function J which seeks to minimize the error term $\epsilon$ which is equivalent to the error function e(t). This cost function J may be represented by the following relationship:

$$J = \frac{1}{2}\varepsilon^2 = \frac{(r(t)-y(t))^2}{2} = \frac{(r(t)-f(t)-\theta^T\phi)^2}{2} \quad [6]$$

As J has a global minimum, an adaptive PID control algorithm using a gradient search for the global minimum may be represented by the following relationship:

$$\dot{\theta} = -\Gamma * \nabla J_\theta = \Gamma * \varepsilon * g(t) * \begin{bmatrix} e(t) \\ \int e(t)dt \\ \dot{e}(t) \end{bmatrix} \quad [7]$$

wherein $\Gamma$ is an adaptive gain,
$\nabla J_\theta$ is a gradient of the cost function with respect to theta,
$\epsilon$ is an error value equivalent to e(t).

For a discrete algorithm, this relationship may be expressed by the following relationship:

$$\begin{bmatrix} K_P(k+1) \\ K_I(k+1) \\ K_D(k+1) \end{bmatrix} = \begin{bmatrix} K_P(k) \\ K_I(k) \\ K_D(k) \end{bmatrix} + \Delta T * \Gamma * g(t) * \begin{bmatrix} e(t) \\ \int e(t)dt \\ \dot{e}(t) \end{bmatrix} \varepsilon \quad [8]$$

wherein k is a present iteration of a scheduled gain, and
ΔT is a discrete sampling rate.

For a general nonlinear system, the adaptive algorithm may find a local minimum. The adaptive algorithm for adaptive PID control of a general nonlinear system may be expressed by the following relationships:

$$y = F(u(t)) = F\left(K_P e(t) + K_I \int e(t)dt + K_D \dot{e}(t)\right) \quad [9]$$

$$\begin{bmatrix} K_P(k+1) \\ K_I(k+1) \\ K_D(k+1) \end{bmatrix} = \begin{bmatrix} K_P(k) \\ K_I(k) \\ K_D(k) \end{bmatrix} + \Delta T * \Gamma * F'_u(t) * \begin{bmatrix} e(t) \\ \int e(t)dt \\ \dot{e}(t) \end{bmatrix} \varepsilon \quad [10]$$

wherein $F'_u(t)$ is a partial derivative of the plant function.

Since gain scheduling is based on PID designs for linearized systems at each operating condition, this adaptive algorithm can modify the scheduled gains to improve system transient responses and robustness to system uncertainties, and can additionally compensate system performances due to aging.

Figure 4:
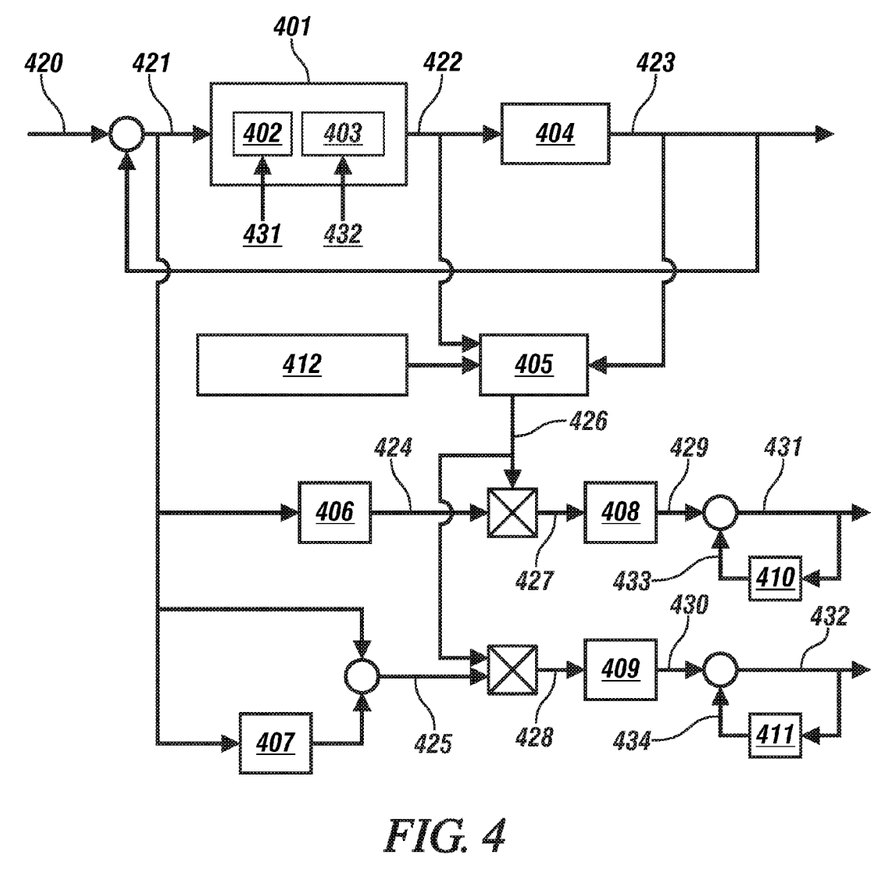
FIG. 4 schematically depicts an exemplary adaptive PID control flowchart, in accordance with the present disclosure.

FIG. 4 schematically depicts an exemplary adaptive PID control system flowchart, in accordance with the present disclosure. As with the exemplary closed-loop feedback system depicted by FIG. 3, a system to be controlled 404 is represented by a mathematical model, time-varying plant function F(u(t)). A reference setpoint r(t) 420 is input into the feedback system. The reference setpoint 420 is then compared with a measured output of the system to be controlled y(t) 423 and the difference is the error value e 421, determined by error function e(t). Error value 421 is input into a PID controller 401. In this adaptive PID control method, the PID controller determines proportional gain 402 and integral gain 403 based on the error value 421, and further adds a determined change in proportional gain $\Delta K_p$ 431 and a determined change in integral gain $\Delta K_I$ 432 to modify the scheduled gains. The determined proportional gain 402 and integral gain 403 terms are summed up to calculate the output of the PID controller, feedback control command u(t) 422. Feedback control command 422 is then input into the time-varying plant F(u(t)) of the system to be controlled 404, thus controlling the system 404.

The determined change in proportional gain $\Delta K_p$ 431 and the determined change in integral gain $\Delta K_I$ 432 are calculated using the following process, as is depicted in the flowchart of FIG. 4. Error value 421 is input into module 406 which squares error value 421, determining an output value 424. Error value 421 is additionally input into module 407 which executes a function that is the integral of the error value 421. The integral of the error value 421 is multiplied by the actual error value 421 to determine an output value 425 as is expressed by equation 10. Feedback control command 422, and measured system output 423 are input into derivative module 405. Additional enabling conditions 412 are additionally considered by derivative module 405 to determine whether to calculate the derivative, thus providing for an adaptation to the PID control, or to set the output to zero, meaning no adaptation is provided. The additional enabling conditions 412 may be expressed by the following relationship:

$$\frac{\partial y}{\partial u} = \begin{cases} \frac{\partial y}{\partial u}, & \Delta y \geq \varepsilon_1 \ \& \ \Delta u \geq \varepsilon_2 \\ 0, & \text{otherwise} \end{cases} \quad [11]$$

wherein $\epsilon_1$ is a threshold minimum error value relative to the y(t), and
$\epsilon_2$ is a threshold minimum error value relative to u(t).

The output 426 of derivative module 405 is multiplied by the squared error value 424 to determine the term $e(t)*\epsilon*F'_u(t)$ as expressed by equation 10. This term is output as value 427, which is then multiplied by adaptation rate ΓΔT 408 in accordance with equation 10, and this term is output 429. Output term 429 is then integrated at integration module 410 to determine $\Delta K_p$ 431, as is expressed by equation 10. The output 426 of derivative module 405 is also multiplied by output term 425 to determine term 428, which may be expressed as $\int e(t)dt*\epsilon*F'_u(t)$. Term 428 is then multiplied by adaptation rate ΓΔT 409 to determine output term 430. Output term 430 is then integrated at integration module 411 to determine $\Delta K_I$ 432. This method may additionally be implemented to modify the scheduled derivative gain $K_D$ as is expressed by equation 10.

Figure 5:
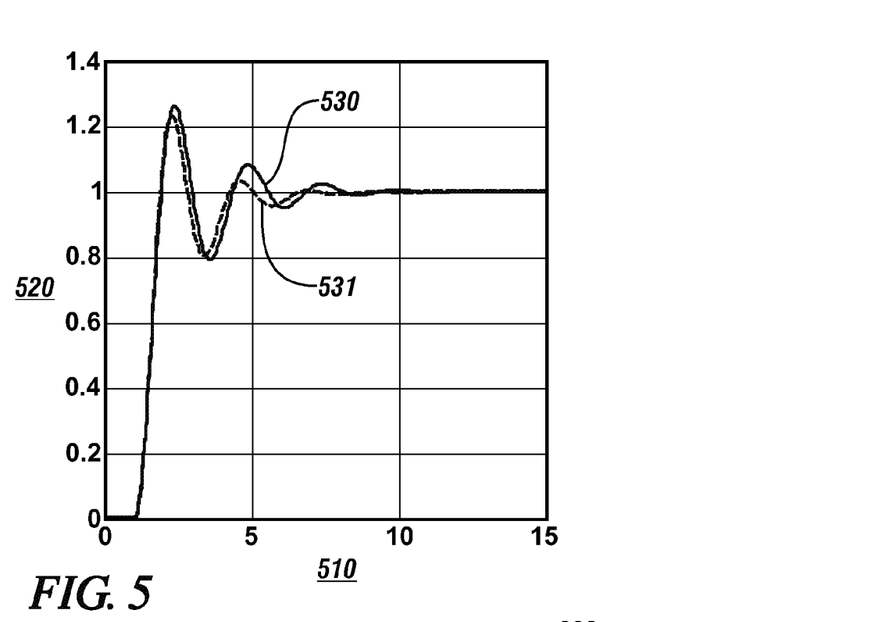
FIG. 5 graphically depicts a comparison of adaptive PID control and default PID control, in accordance with the present disclosure.

FIG. 5 graphically depicts a comparison of adaptive PID control and default PID control, in accordance with the present disclosure. This depiction of adaptive tuning is in relation to a numerative example of a second order system. Default PID control 530 is compared to adaptive PID control 531. Over time 510, the output 520 of adaptive PID control 531 is shown to have an improved response time, as well as reduced overshoot and settling time.

Figure 61:
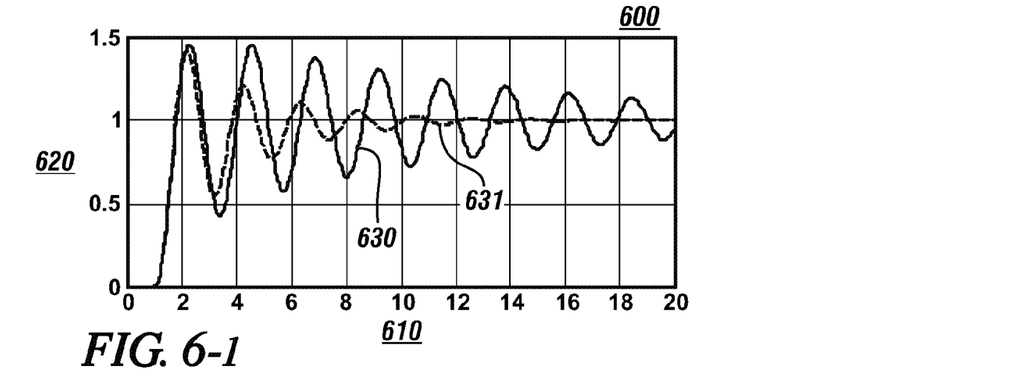

FIG. 6-1 graphically depicts a comparison of adaptive PID control and default PID control with a damping decrease of 50%, in accordance with the present disclosure. This depiction of adaptive tuning is in relation to a numerative example of a second order system. Default PID control 630 is compared to adaptive PID control 631. Over time 610, the output 620 of adaptive PID control 631 is shown to have an improved response time, as well as reduced overshoot and settling time. The increase in oscillation of the PID control would be stabilized with damping to prevent oscillation. The adaptive PID control has improved robustness of the PID control.

Figure 62:
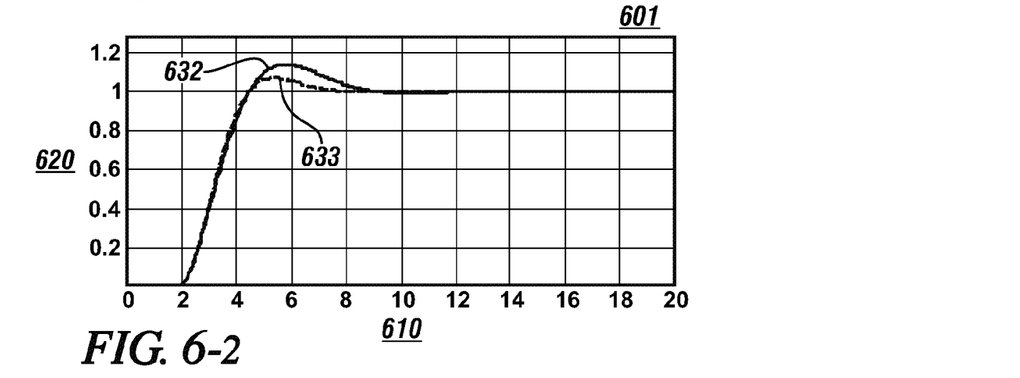

FIG. 6-2 graphically depicts a comparison of adaptive PID control and default PID control with a damping increase of 100%, in accordance with the present disclosure. This depiction of adaptive tuning is in relation to a numerative example of a second order system. Default PID control 632 is compared to adaptive PID control 633. Over time 610, the output 620 of adaptive PID 633 is shown to have an improved response time, as well as reduced overshoot and settling time. In both instances of plant damping coefficient changes adaptive PID control improved robustness of the control.

Figure 7:
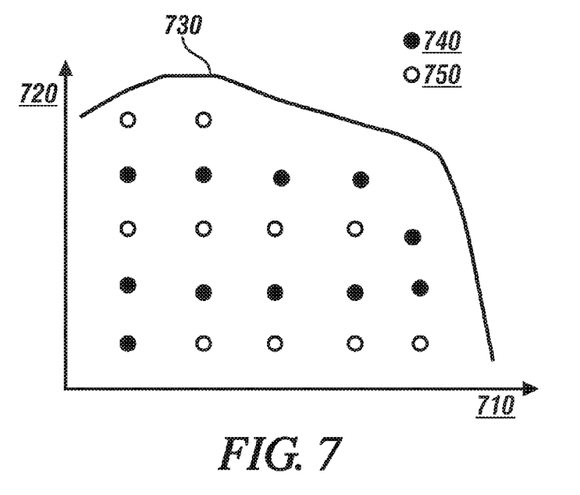
FIG. 7 graphically depicts potential calibration reduction for gain-scheduling with adaptive PID control, in accordance with the present disclosure.

FIG. 7 graphically depicts potential calibration reduction for gain-scheduling with adaptive PID control, in accordance with the present disclosure. Scheduled gain 730 is a function of rpm 710 and fuel 720. Where gain-scheduling with default PID control would require calibration at each matrix point illustrated in FIG. 7, gain-scheduling with adaptive PID control allows for calibration to only be required at select points 740. Through adaptation, points 750 may be determined without additional calibration resulting in a reduced number of PID calibrations required in gain-scheduling.

Figure 8:
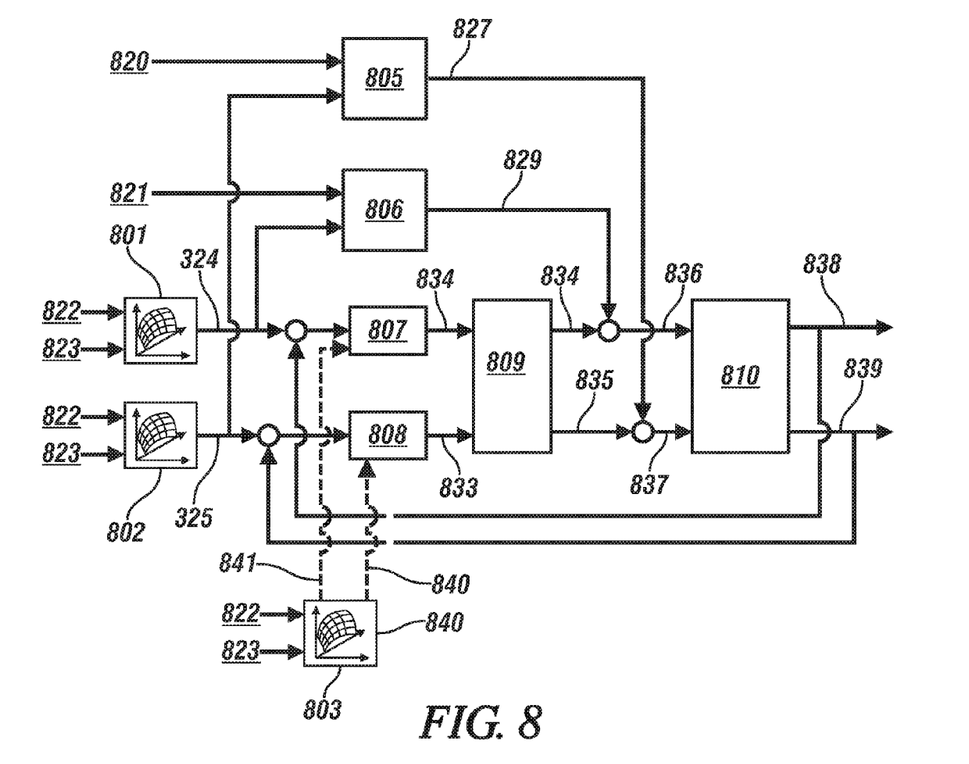
FIG. 8 schematically depicts an exemplary adaptive PID control for a model-based MIMO airpath system, in accordance with the present disclosure.

FIG. 8 schematically depicts an exemplary adaptive PID control for a model-based MIMO airpath system, in accordance with the present disclosure. This exemplary air charging multivariable control system, uses model-based feedforward control and PID feedback control methods. Air charging system 810 receives commands and produces outputs. A number of modules and control strategies are depicted developing the commands, including the feedback control modules 807 and 808, and the feedforward control modules 805 and 806. Target EGR value 824 and boost target 825 may be determined by lookup table 801 and 802 respectively as a function of a monitored fuel value 822 and a monitored rpm value 823. These target values 824 and 825 are compared with corresponding feedback signals 838 and 839 which are determined by either direct sensor measurements or may alternatively be estimated by a state variable observer based on the actual operating parameters of the air charging system 810. These operating parameters may include, for example, intake manifold pressure, intake manifold temperature, air mass, ambient pressure, and ambient temperature.

The air charging system parameters may be monitored by sensors or alternatively estimated by a state variable observer. Exemplary estimated air charging system parameters may include actual compressor pressure ratio, and exhaust manifold pressure. The monitored and estimated system operating parameters may be used to determine feedback signals. The feedback signals describe actual EGR 838 and actual boost pressure 839. The comparison of the desired operating parameters and the respective actual operating parameters determines error terms for each parameter including an EGR error term 830 and a boost pressure error term 831. These error terms are then input into the feedback control modules 807 and 808 respectively. The adaptive transient control methods, in accordance with the present disclosure, may be implemented by control modules 807 and 808 such that scheduled gains determined by the PID feedback control methods of modules 807 and 808 are modified by the adaptive transient values 841 and 840. Adaptive transient values 841 and 840 are determined by module 803 as a function of a monitored fuel value 822 and a monitored rpm value 823. The PID feedback control method, including adaptive transient control, implemented by each of feedback control modules 807 and 808 determines feedback control signals 832 and 833. Feedback control signals 832 and 833 are input into module 809 where the control signals are inverted to determine feedback signals 834 and 835.

Desired operating parameter points, including target EGR 824 and target boost pressure 825 are additionally input into feedforward control modules 805 and 806 respectively, in addition to monitored operating parameters 820 and 821. Feedforward control module 805 utilizes a physical VGT inverse model to determine feedforward VGT control command 827 and feedforward control module 806 utilizes a physical EGR inverse model to determine feedforward EGR control command 829. Feedback signals 834 and 835 are then combined with feedforward control commands 827 and 829 respectively to determine EGR control command 836 and VGT control command 837 which are used to control air charging system 810.

Figure 9:
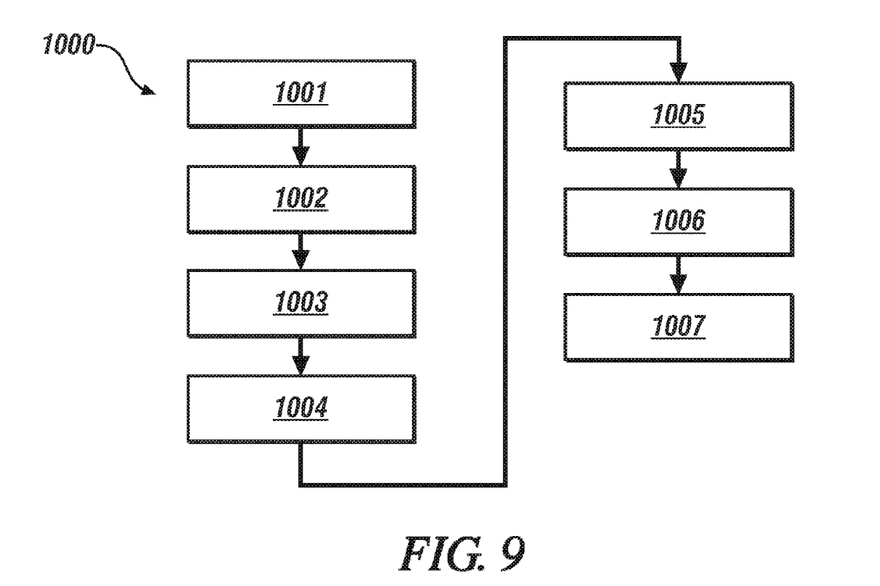
FIG. 9 graphically depicts a comparison of commanded boost pressure and actual boost pressure over time with adaptive PID tuning, in accordance with the present disclosure.

FIG. 9 graphically depicts a comparison of commanded boost pressure and actual boost pressure over time with adaptive PID tuning, in accordance with the present disclosure. Commanded boost pressure 930 and actual boost pressure 931 are plotted with boost pressure 920 over time 910. Adaptive PID tuning begins at 78 seconds. Upon initiation of the adaptive tuning commanded boost pressure is shown to track actual boost pressure with decreased error.

Figure 10:
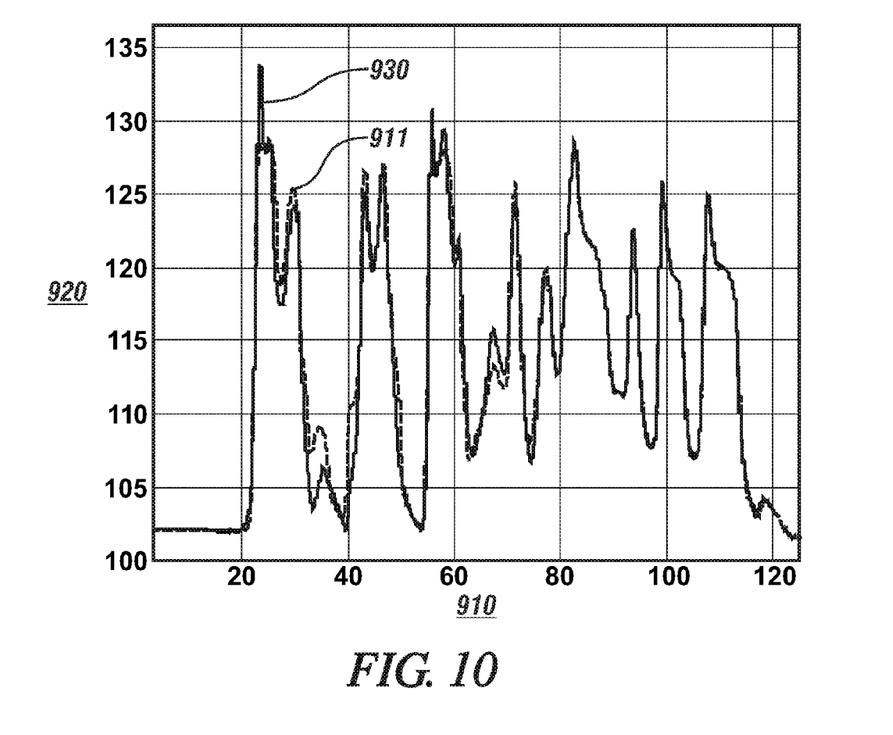
FIG. 10 depicts an exemplary process of adaptive PID control, in accordance with the present disclosure.

FIG. 10 depicts an exemplary process of adaptive PID control, in accordance with the present disclosure. Table 1 is provided as a key wherein the numerically labeled blocks and the corresponding functions are set forth as follows.

TABLE 1

| BLOCK | BLOCK CONTENTS |
|---|---|
| 1001 | Monitor a desired operating target command for the air charging system |
| 1002 | Monitor operating parameters of the air charging system |
| 1003 | Determine an error between the monitored desired operating target command for the air charging system and the monitored operating parameter of the air charging system |
| 1004 | Determine scheduled PID gains based on the determined error utilizing a PID controller |
| 1005 | Apply an adaptive algorithm to modify the determined scheduled PID gains; |
| 1006 | Determine a system control command for the air charging system based upon the modified scheduled PID gains; and |
| 1007 | Control the air charging system based upon the system control command for the air charging system. |

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control an air charging system of an internal combustion engine, the method comprising:

providing a desired operating target command for the air charging system;

monitoring operating parameters of the air charging system;

determining an error between the desired operating target command for the air charging system and the corresponding one of said operating parameters of the air charging system;

determining scheduled PID gains based on the error utilizing a PID controller expressed in accordance with the following relationship:

$$u(t) = K_P e(t) + K_I \int e(t) dt + K_D \dot{e}(t)$$

wherein $K_P$ is a proportional gain, $K_I$ is an integral gain, $K_D$ is a derivative gain, t is time, and e(t) is an error function determining an error value between a setpoint and a monitored system parameter;

applying an adaptive algorithm to modify the scheduled PID gains using a gradient search expressed in accordance with the following relationship:

$$\dot{\theta} = -\Gamma * \nabla J_\theta = \Gamma * \varepsilon * g(t) * \begin{bmatrix} e(t) \\ \int e(t)dt \\ \dot{e}(t) \end{bmatrix}$$

wherein $\Gamma$ is an adaptive gain,
$\nabla J_\theta$ is a global minimum of the cost function,
$\epsilon$ is an error value equivalent to e(t),
g(t) is a system gain function,
$\theta$ is a vector of PID gains;
determining a system control command for the air charging system based upon the modified scheduled PID gains; and
controlling the air charging system based upon the system control command for the air charging system.

2. The method of claim 1, wherein the desired operating target command comprises a target exhaust gas ratio.

3. The method of claim 1, wherein the desired operating target command comprises a target boost pressure.

4. The method of claim 1, wherein the operating parameters of the air charging system comprise intake manifold pressure, intake manifold temperature, compressor inlet pressure and compressor inlet temperature.

5. Method to control an air charging system of an internal combustion engine, the method comprising:
providing a desired operating target command for the air charging system;
monitoring operating parameters of the air charging system;
determining an error between the desired operating target command for the air charging system and the corresponding one of said operating parameters of the air charging system;
determining scheduled PID gains based on the error utilizing a PID controller expressed in accordance with the following relationship:

$$u(t) = K_p e(t) + K_I \int e(t)dt + K_D \dot{e}(t)$$

wherein $K_p$ is a proportional gain,
$K_I$ is an integral gain,
$K_D$ is a derivative gain,
t is time, and
e(t) is an error function determining an error value between a setpoint and a monitored system parameter;
applying an adaptive algorithm to modify the scheduled PID gains expressed in accordance with the following relationship:

$$\begin{bmatrix} K_P(k+1) \\ K_I(k+1) \\ K_D(k+1) \end{bmatrix} = \begin{bmatrix} K_P(k) \\ K_I(k) \\ K_D(k) \end{bmatrix} + \Delta T * \Gamma * g(t) * \begin{bmatrix} e(t) \\ \int e(t)dt \\ \dot{e}(t) \end{bmatrix} \varepsilon$$

wherein k is a present iteration of a scheduled gain, and
$\Delta T$ is a discrete sampling rate,
$\Gamma$ is an adaptive gain,
g(t) is a system gain function, and
$\epsilon$ is an error value equivalent to e(t);
determining a system control command for the air charging system based upon the modified scheduled PID gains; and
controlling the air charging system based upon the system control command for the air charging system.

6. Method to control an air charging system of an internal combustion engine, the method comprising:
providing a desired operating target command for the air charging system;
monitoring operating parameters of the air charging system;
determining an error between the desired operating target command for the air charging system and the corresponding one of said operating parameters of the air charging system;
determining scheduled PID gains based on the error utilizing a PID controller expressed in accordance with the following relationship:

$$u(t) = K_p e(t) + K_I \int e(t)dt + K_D \dot{e}(t)$$

wherein $K_p$ is a proportional gain,
$K_I$ is an integral gain,
$K_D$ is a derivative gain,
t is time, and
e(t) is an error function determining an error value between a setpoint and a monitored system parameter;
applying an adaptive algorithm to modify the scheduled PID gains comprising applying an adaptive algorithm for a general nonlinear system expressed in accordance with the following relationship:

$$\begin{bmatrix} K_P(k+1) \\ K_I(k+1) \\ K_D(k+1) \end{bmatrix} = \begin{bmatrix} K_P(k) \\ K_I(k) \\ K_D(k) \end{bmatrix} + \Delta T * \Gamma * F'_u(t) * \begin{bmatrix} e(t) \\ \int e(t)dt \\ \dot{e}(t) \end{bmatrix} \varepsilon$$

wherein k is a present iteration of a scheduled gain, and
$\Delta T$ is a discrete sampling rate,
$\Gamma$ is an adaptive gain,
$F'_u(t)$ is a partial derivative of the plant function, and
$\epsilon$ is an error value equivalent to e(t);
determining a system control command for the air charging system based upon the modified scheduled PID gains; and
controlling the air charging system based upon the system control command for the air charging system.

7. Method to control an air charging system of an internal combustion engine, the method comprising:
providing a desired operating target command for the air charging system;
monitoring operating parameters of the air charging system;
determining an error between the desired operating target command for the air charging system and the corresponding one of said operating parameters of the air charging system;
determining scheduled PID gains based on the error utilizing a PID controller;
applying an adaptive algorithm for a general nonlinear system to modify the scheduled PID gains comprising:
determining a set of PID error terms by multiplying said error by each of a present error, a past error and a prediction of future errors;
determining a set of PID system gain terms by multiplying the set of PID error terms by a system gain based on a partial derivative of a system control command and a partial derivative of the corresponding one of said operating parameters of the air charging system;

determining a set of adapted PID system gains by multiplying the set of PID system gain terms by an adaptation rate;

determining a set of PID scheduled gain modifiers by integrating the set of adapted PID system gains; and modifying the scheduled PID gains by adding the PID scheduled gain modifiers to the scheduled gains;

determining a system control command for the air charging system based upon the modified scheduled PID gains; and controlling the air charging system based upon the system control command for the air charging system.

8. Method to control an exhaust gas recirculation system, an air throttle system, and an air charging system in an internal combustion engine, the method comprising:

providing a desired operating target command for each of the exhaust gas recirculation system, the air throttle system and the air charging system;

monitoring operating parameters for each of the exhaust gas recirculation system, the air throttle system, and the air charging system;

determining an error between the monitored desired operating target commands for each of the exhaust gas recirculation system, the air throttle system, and the air charging system and the corresponding operating parameter of the respective system;

determining scheduled PID gains for each of the exhaust gas recirculation system, the air throttle system and the air charging system based on the respective error for each of the exhaust gas recirculation system, the air throttle system and the air charging system utilizing PID control expressed by the following relationship:

$$u(t) = K_p e(t) + K_I \int e(t)dt + K_D \dot{e}(t)$$

wherein $K_p$ is a proportional gain,
$K_I$ is an integral gain,
$K_D$ is a derivative gain,
t is time, and
e(t) is an error function determining an error value between a setpoint and a monitored system parameter;

applying an adaptive algorithm to modify each of the scheduled PID gains expressed by the following relationship:

$$\begin{bmatrix} K_P(k+1) \\ K_I(k+1) \\ K_D(k+1) \end{bmatrix} = \begin{bmatrix} K_P(k) \\ K_I(k) \\ K_D(k) \end{bmatrix} + \Delta T * \Gamma * g(t) * \begin{bmatrix} e(t) \\ \int e(t)dt \\ \dot{e}(t) \end{bmatrix} \varepsilon$$

wherein k is a present iteration of a scheduled gain, and
$\Delta T$ is a discrete sampling rate,
$\Gamma$ is an adaptive gain,
g(t) is a system gain function, and
$\varepsilon$ is an error value equivalent to e(t);

determining a system control command for each of the exhaust gas recirculation system, the air throttle system and the air charging system based upon the respective modified scheduled PID gains; and controlling the air charging system based upon said system control commands.

9. Method to control an exhaust gas recirculation system, an air throttle system, and an air charging system in an internal combustion engine, the method comprising:

providing a desired operating target command for each of the exhaust gas recirculation system, the air throttle system and the air charging system;

monitoring operating parameters for each of the exhaust gas recirculation system, the air throttle system, and the air charging system;

determining an error between the monitored desired operating target commands for each of the exhaust gas recirculation system, the air throttle system, and the air charging system and the corresponding operating parameter of the respective system;

determining scheduled PID gains for each of the exhaust gas recirculation system, the air throttle system and the air charging system based on the respective error for each of the exhaust gas recirculation system, the air throttle system and the air charging system utilizing PID control expressed by the following relationship:

$$u(t) = K_p e(t) + K_I \int e(t)dt + K_D \dot{e}(t)$$

wherein $K_p$ is a proportional gain,
$K_I$ is an integral gain,
$K_D$ is a derivative gain,
t is time, and
e(t) is an error function determining an error value between a setpoint and a monitored system parameter;

applying an adaptive algorithm to modify each of the scheduled PID gains comprising applying an adaptive algorithm for a general nonlinear system expressed in accordance with the following relationship:

$$\begin{bmatrix} K_P(k+1) \\ K_I(k+1) \\ K_D(k+1) \end{bmatrix} = \begin{bmatrix} K_P(k) \\ K_I(k) \\ K_D(k) \end{bmatrix} + \Delta T * \Gamma * F'_u(t) * \begin{bmatrix} e(t) \\ \int e(t)dt \\ \dot{e}(t) \end{bmatrix} \varepsilon$$

wherein k is a present iteration of a scheduled gain, and
$\Delta T$ is a discrete sampling rate,
$\Gamma$ is an adaptive gain,
$F'_u(t)$ is a partial derivative of the plant function and
$\varepsilon$ is an error value equivalent to e(t);

determining a system control command for each of the exhaust gas recirculation system, the air throttle system and the air charging system based upon the respective modified scheduled PID gains; and controlling the air charging system based upon said system control commands.

10. The method of claim 9, wherein the desired operating target command for each of the exhaust gas recirculation system, the air throttle system and the air charging system comprise a target exhaust gas ratio, a target compressor pressure ratio, and a target boost pressure.

11. The method of claim 9, wherein the operating parameters of the air charging system comprise intake manifold pressure, intake manifold temperature, compressor inlet pressure and compressor inlet temperature.

12. The method of claim 9, wherein determining scheduled PID gains for each of the exhaust gas recirculation system, the air throttle system and the air charging system comprises:

determining scheduled PID gains for a first one of the exhaust gas recirculation system, the air throttle system and the air charging system using a PID controller;

determining scheduled PID gains for a second one of the exhaust gas recirculation system, the air throttle system and the air charging system using a PID controller; and determining scheduled PID gains for a third one of the exhaust gas recirculation system, the air throttle system and the air charging system using a PID controller.

13. Method to control an exhaust gas recirculation system, an air throttle system, and an air charging system in an internal combustion engine, the method comprising:

providing a desired operating target command for each of the exhaust gas recirculation system, the air throttle system and the air charging system;

monitoring operating parameters for each of the exhaust gas recirculation system, the air throttle system, and the air charging system;

determining an error between the monitored desired operating target commands for each of the exhaust gas recirculation system, the air throttle system, and the air charging system and the corresponding operating parameter of the respective system;

determining scheduled PID gains for each of the exhaust gas recirculation system, the air throttle system and the air charging system based on the respective error for each of the exhaust gas recirculation system, the air throttle system and the air charging system utilizing PID control;

applying an adaptive algorithm to modify each of the scheduled PID gains, wherein applying the adaptive algorithm to modify each of the scheduled PID gains comprises for each of the exhaust gas recirculation system, air throttle system and air charging system:

determining a set of PID error terms by multiplying said error between the monitored desired operating target command for the respective system and the corresponding monitored operating parameter of the respective system by each of a present error, a past error and a prediction of future errors;

determining a set of PID system gain terms by multiplying the set of PID error terms by a system gain based on a partial derivative of a system control command and a partial derivative of the corresponding monitored operating parameter of the respective system;

determining a set of adapted PID system gains by multiplying the set of PID system gain terms by an adaptation rate;

determining a set of PID scheduled gain modifiers by integrating the set of adapted PID system gains; and modifying the scheduled PID gains by adding the PID scheduled gain modifiers to the scheduled gains;

determining a system control command for each of the exhaust gas recirculation system, the air throttle system and the air charging system based upon the respective modified scheduled PID gains; and controlling the air charging system based upon said system control commands.

14. Method to control an air charging system using on-line fine tuning of PID gains comprising:

providing a desired operating target command for the air charging system;

monitoring an operating parameter of the air charging system;

determining an error between the desired operating target command for the air charging system and the monitored operating parameter of the air charging system;

determining scheduled PID gains based on the error utilizing a PID controller;

applying adaptive PID control to modify the scheduled PID gains, comprising;

determining a set of PID error terms by multiplying the error between the monitored desired operating target command for the air charging system and the monitored operating parameter of the air charging system by each of a present error, a past error and a prediction of future errors;

determining a set of PID system gain terms by multiplying the set of PID error terms by a system gain based on a partial derivative of a system control command and a partial derivative of the operating parameter of the air charging system;

determining a set of adapted PID system gains by multiplying the PID system gain terms by an adaptation rate;

determining a set of PID scheduled gain modifiers by integrating the set of adapted PID system gains;

modifying the scheduled PID gains by adding the PID scheduled gain modifiers to the scheduled gains;

determining a system control command for the air charging system based upon the modified scheduled gains; and controlling the air charging system based upon the system control command for the air charging system.

15. The method of claim 14, wherein said scheduled PID gains are determined in accordance with the following relationship:

$$u(t)=K_P e(t)+K_I \int e(t)dt+K_D \dot{e}(t)$$

wherein $K_P$ is a proportional gain,
$K_I$ is an integral gain,
$K_D$ is a derivative gain,
t is time, and
e(t) is an error function determining an error value between a setpoint and a monitored system parameter.

16. The method of claim 14, wherein the desired operating target command comprises one of a target boost pressure and a target exhaust gas ratio.

* * * * *